US011811618B1

(12) United States Patent
Kozlova et al.

(10) Patent No.: US 11,811,618 B1
(45) Date of Patent: Nov. 7, 2023

(54) SYSTEMS AND METHODS FOR EFFICIENT PRESENTATION OF DEVICE-LEVEL INFORMATION VIA SCALABLE INTERACTIVE DEVICE-VISUALIZATION INTERFACES

(71) Applicant: Juniper Networks, Inc., Sunnyvale, CA (US)

(72) Inventors: Yelena Kozlova, Sunnyvale, CA (US); Lyubov Nesteroff, Sunnyvale, CA (US); Jeffrey S. Marshall, Sunnyvale, CA (US); Sadhana Rajan, Sunnyvale, CA (US); Bret Michael Bailey, Sunnyvale, CA (US); Vinamra Jaiswal, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/806,937

(22) Filed: Jun. 14, 2022

Related U.S. Application Data

(63) Continuation of application No. 16/824,503, filed on Mar. 19, 2020, now Pat. No. 11,394,622.

(51) Int. Cl.
*H04L 41/22* (2022.01)
*G06F 3/04812* (2022.01)
*G06F 3/04817* (2022.01)
*H04L 67/75* (2022.01)
*H04L 41/069* (2022.01)

(52) U.S. Cl.
CPC .......... *H04L 41/22* (2013.01); *G06F 3/04812* (2013.01); *G06F 3/04817* (2013.01); *H04L 67/75* (2022.05); *H04L 41/069* (2013.01)

(58) Field of Classification Search
CPC ....... H04L 41/22; H04L 67/36; H04L 41/069; G06F 3/04817; G06F 3/04812
See application file for complete search history.

(56) References Cited

U.S. PATENT DOCUMENTS

| 6,272,537 B1 * | 8/2001 | Kekic | H04L 41/046 |
| | | | 719/329 |
| 2005/0138160 A1 * | 6/2005 | Klein | H04L 41/22 |
| | | | 715/248 |

* cited by examiner

*Primary Examiner* — Andrey Belousov
(74) *Attorney, Agent, or Firm* — Greenberg Traurig, LLP (57) ABSTRACT

A disclosed method may include (1) querying, in connection with a monitoring service, a network device for device-specific data that identifies features of the network device, (2) determining, based at least in part on the device-specific data, identities of a set of ports on the network device, (3) identifying, based at least in part on the device-specific data, one or more port-specific data objects corresponding to the set of ports, (4) dynamically creating, based at least in part on the device-specific data, a device-visualization interface of the network device by (A) generating a graphical chassis widget that illustrates a logical view of the set of ports and (B) generating a graphical table that illustrates the port-specific data objects, and then (5) providing, in connection with the monitoring service, the device-visualization interface for presentation on a computing device. Various other systems and methods are also disclosed.

20 Claims, 6 Drawing Sheets

SYSTEMS AND METHODS FOR EFFICIENT PRESENTATION OF DEVICE-LEVEL INFORMATION VIA SCALABLE INTERACTIVE DEVICE-VISUALIZATION INTERFACES

CROSS REFERENCE TO RELATED APPLICATION

This application is a continuation of U.S. application Ser. No. 16/824,503 filed 19 Mar. 2020, the disclosure of which is incorporated in its entirety by this reference.

BACKGROUND

Networks often include various components that facilitate and/or support the flow of traffic from one device to another. The performance levels of these components may indicate and/or suggest the presence of certain network issues, bottlenecks, and/or weak links. In some examples, administrators and/or decision engines may be able to address and/or fix such network issues, bottlenecks, and/or weak links, thereby potentially improving the overall performance levels of the networks themselves.

Conventional network technologies may be unable to efficiently deliver and/or present certain network information for consumption and/or analysis by administrators and/or decision engines. As a result, administrators and/or decision engines may be forced to consume and/or analyze such network information via disjointed, convoluted, and/or disorganized delivery and/or presentation interfaces. Unfortunately, the longer network administrators and/or decision engines take to consume and/or analyze such network information, the longer the network issues, bottlenecks, and/or weak links may remain undetected and/or unidentified. Similarly, the longer the network issues, bottlenecks, and/or weak links remain undetected and/or unidentified, the longer the networks may perform sub-optimally.

In addition, conventional network technologies may implement and/or deploy visualization interfaces that rely on and/or necessitate static bitmap images for monitored devices. As networks and network devices evolve and/or advance over time, such static bitmap images may become outdated and/or be unable to graphically represent other devices. As a result, these conventional network technologies may call for frequent updates to the static bitmap images. Unfortunately, such updates may be time-consuming and/or expensive for vendors to perform, especially on a regular basis.

The instant disclosure, therefore, identifies and addresses a need for additional systems and methods for efficient presentation of device-level information via scalable interactive device-visualization interfaces.

SUMMARY

As will be described in greater detail below, the instant disclosure generally relates to systems and methods for efficient presentation of device-level information via scalable interactive device-visualization interfaces. In one example, a method for accomplishing such a task may include (1) querying, in connection with a monitoring service, a network device for device-specific data that identifies features of the network device, (2) determining, based at least in part on the device-specific data, identities of a set of ports on the network device, (3) identifying, based at least in part on the device-specific data, one or more port-specific data objects corresponding to the set of ports on the network device, (4) dynamically creating, based at least in part on the device-specific data, a device-visualization interface of the network device by (A) generating a graphical chassis widget that illustrates a logical view of the set of ports on the network device and (B) generating a graphical table that illustrates the port-specific data objects, and then (5) providing, in connection with the monitoring service, the device-visualization interface for presentation on a computing device.

Similarly, a system that implements the above-identified method may include a physical processor configured to execute various modules stored in memory. In one example, this system may include and/or execute (1) a query module that queries, in connection with a monitoring service, a network device for device-specific data that identifies features of the network device, (2) a determination module that (A) determines, based at least in part on the device-specific data, identities of a set of ports on the network device and (B) identifies, based at least in part on the device-specific data, one or more port-specific data objects corresponding to the set of ports on the network device, (3) a creation module that dynamically creates, based at least in part on the device-specific data, a device-visualization interface of the network device by (A) generating a graphical chassis widget that illustrates a logical view of the set of ports on the network device and (B) generating a graphical table that illustrates the port-specific data objects, and (4) a presentation module, stored in memory, that provides, in connection with the monitoring service, the device-visualization interface for presentation on a computing device.

Additionally or alternatively, a non-transitory computer-readable medium that implements the above-identified method may include one or more computer-executable instructions. When executed by at least one processor of a computing device, the computer-executable instructions may cause the computing device to (1) query, in connection with a monitoring service, a network device for device-specific data that identifies features of the network device, (2) determine, based at least in part on the device-specific data, identities of a set of ports on the network device, (3) identify, based at least in part on the device-specific data, one or more port-specific data objects corresponding to the set of ports on the network device, (4) dynamically create, based at least in part on the device-specific data, a device-visualization interface of the network device by (A) generating a graphical chassis widget that illustrates a logical view of the set of ports on the network device and (B) generating a graphical table that illustrates the port-specific data objects, and then (5) provide, in connection with the monitoring service, the device-visualization interface for presentation on a computing system.

Features from any of the above-mentioned embodiments may be used in combination with one another in accordance with the general principles described herein. These and other embodiments, features, and advantages will be more fully understood upon reading the following detailed description. While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As detailed above, the instant disclosure generally relates to systems and methods for efficient presentation of device-level information via scalable interactive device-visualization interfaces. In some examples, the disclosed embodiments may provide and/or facilitate a single view of a system's performance information via an interactive device-visualization interface. In such examples, the single view of the system's performance may constitute and/or represent a graphical chassis widget that illustrates a set of physical ports on the system and a graphical table that illustrates port-specific data objects corresponding to those physical ports. The single view of the system's performance may provide and/or facilitate a comprehensive graphical and/or textual overview of the system's physical ports and their corresponding statuses, statistics, metadata, and/or alarms.

Son-le embodiments of the instant disclosure may involve and/or provide a device-visualization interface that is able to scale to any network device monitored by a monitoring service. For example, the device-visualization interface may be able to produce, deliver, and/or present a graphical chassis widget that illustrates a logical view of a set of ports on a network device. In this example, the device-visualization interface may be agnostic and/or customizable to the configuration and/or characteristics of the network device. In other words, the device-visualization interface may scale to any network device irrespective of its make, model, and/or features. Accordingly, the device-visualization interface may be able to mitigate and/or eliminate the need for a static bitmap image for each type of device monitored by the monitoring service, thereby leading to and/or facilitating less frequent, less time-consuming, and/or less expensive updates.

Other embodiments of the instant disclosure may involve and/or provide interactive graphical and/or textual features that facilitate selecting an action to be performed in connection with one or more ports on a network device monitored by the monitoring service. For example, an administrator of a network device may be able to select an action to be performed on that network device via a device-visualization interface deployed in connection with the monitoring service. In one example, the action may involve and/or be directed to pinging a specific port on the network device. Additionally or alternatively, the action may involve and/or be directed to performing a traceroute in connection with a specific port on the network device. In response to the administrator's selection, the device-visualization interface may initiate and/or launch the selected action.

In some examples, the single view of the system's performance may combine various graphical user interface elements laid out for display in a unified view of performance. Examples of such user interface elements include, without limitation, widgets, tables, cards, filters, tooltips, and/or data graphs, combinations and/or variations of one or more of the same, and/or any other suitable user interface elements.

Figure 1:
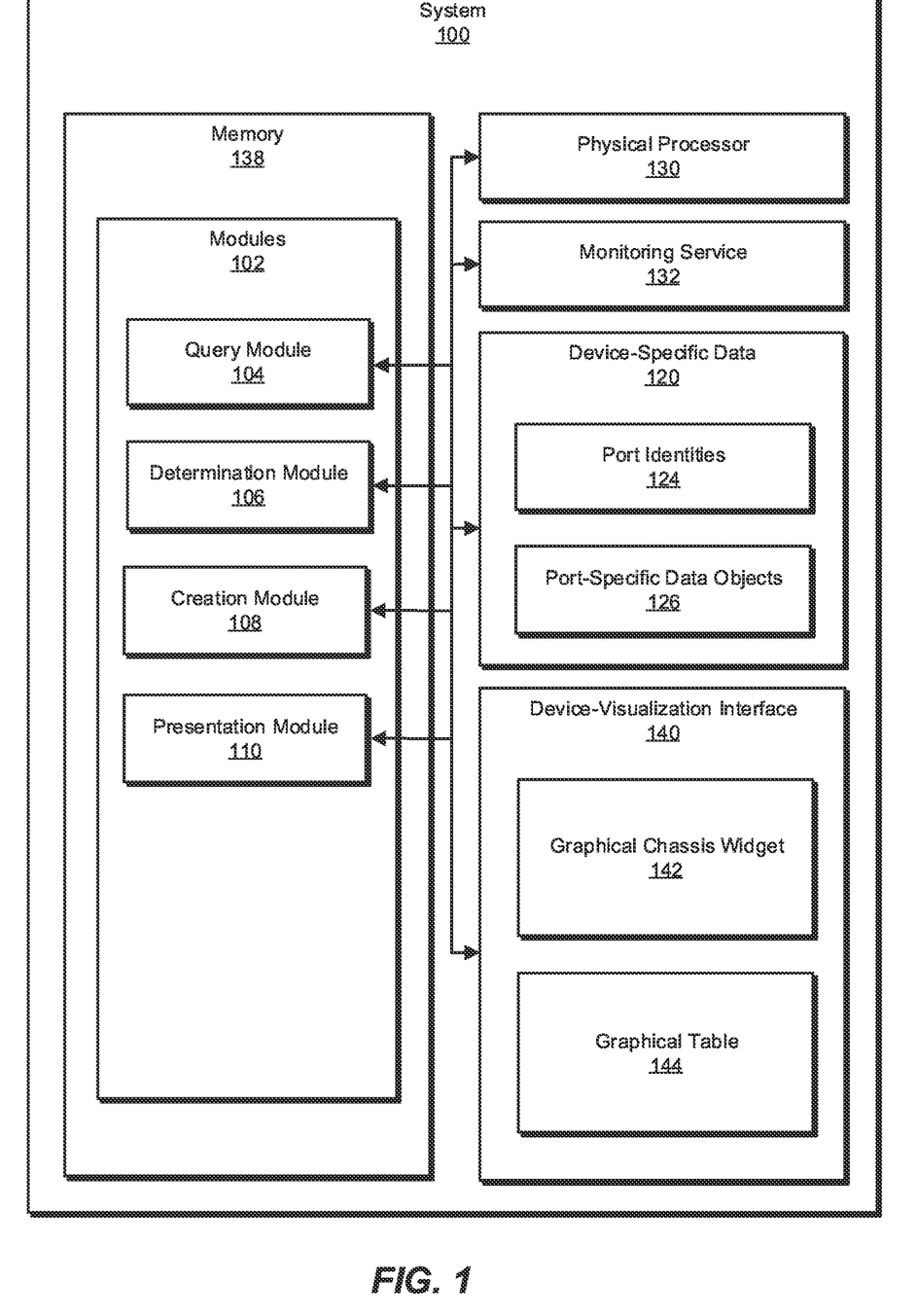
FIG. 1 is a block diagram of an exemplary system for efficient presentation of device-level information via scalable and interactive device-visualization interfaces.
Figure 2:
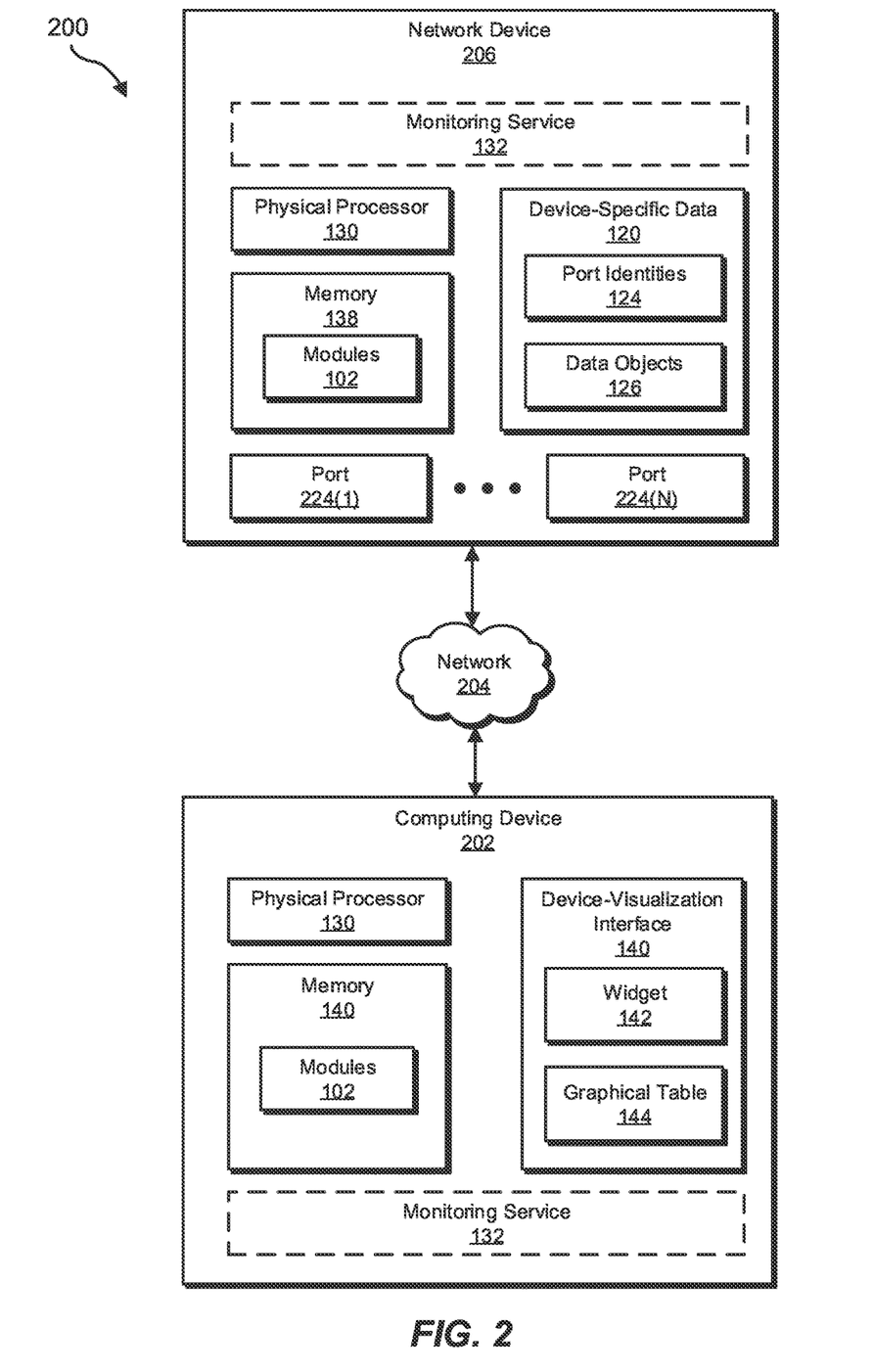
FIG. 2 is a block diagram of an additional exemplary system for efficient presentation of device-level information via scalable interactive device-visualization interfaces.

The following will provide, with reference to FIGS. 1 and 2 detailed descriptions of exemplary systems and corresponding implementations for efficient delivery and presentation of network information. Detailed descriptions of exemplary device-visualization interfaces and/or views of the same will be provided in connection with FIGS. 4 and 5. Detailed descriptions of computer-implemented methods for efficient delivery and presentation of network information will be provided in connection with FIG. 3. In addition, detailed descriptions of an exemplary computing system for carrying out these methods will be provided in connection with FIG. 6.

FIG. 1 shows an exemplary system 100 that facilitates efficient delivery and presentation of network information. As illustrated in FIG. 1, system 100 may include one or more modules 102 for performing one or more tasks. As will be explained in greater detail below, modules 102 may include a query module 104, a determination module 106, a creation module 108, and a presentation module 110. Although illustrated as separate elements, one or more of modules 102 in FIG. 1 may represent portions of a single module, application (e.g., monitoring service 132 in FIG. 1), and/or operating system.

In certain embodiments, one or more of modules 102 in FIG. 1 may represent one or more software applications or programs that, when executed by a processor of a computing device, cause the computing device to perform one r more tasks. For example, and as will be described in greater detail below, one or more of modules 102 may represent modules stored and configured to run on one or more computing devices, such as the devices illustrated in FIG. 2 (e.g., computing device 202 and/or network device 206). One or more of modules 102 in FIG. 1 may also represent all or portions alone or more special-purpose computers configured to perform one or more tasks.

As illustrated in FIG. 1, exemplary system 100 may also include one or more memory devices, such as memory 138. Memory 138 generally represents any type or form of volatile or non-volatile storage device or medium capable of storing data and/or computer-readable instructions. In one example, memory 138 may store, load, and/or maintain one or more of modules 102. Examples of memory 138 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 138. Additionally or alternatively, physical processor 130 may execute one or more of modules 102 to facilitate efficient delivery and presentation of network information. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), portions of one or more of the same, variations or combinations of one or more of the same, and/or any other suitable physical processor.

As illustrated in FIG. 1, exemplary system 100 may further include, deploy, and/or execute one or more monitoring services, such as monitoring service 132. In some examples, monitoring service 132 may include and/or represent an application and/or software program that monitors certain network activities, behaviors, and/or events in connection with a tenant and/or customer of a network and/or service provider. Additionally or alternatively, monitoring service 132 may collect data and/or information about the performance of certain network systems, devices, Field Replaceable Units (FRUs), linecards, and/or ports associated with the tenant and/or customer of the network and/or service provider. Further, monitoring service 132 may facilitate displaying and/or presenting such data and/or information to an administrator and/or analyst associated with or employed by the tenant and/or customer of the network and/or service provider. In one example, monitoring service 132 may include and/or represent a distributed software application that executes and/or deploys one or more of modules 102.

As illustrated in FIG. 1, exemplary system 100 may additionally include, track, and/or record one or more device-specific data, such as device-specific data 120. In some examples, device-specific data 120 may include and/or represent any type or form of data, information, metadata, and/or statistics associated with the performance and/or health of certain network systems, devices, and/or features associated with a tenant and/or customer of a network and/or service provider. In one example, device-specific data 120 may include and/or represent port identities 124 and/or port-specific data objects 126. In this example, port identities 124 may specify and/or represent certain ports by name and/or identifier, and port-specific data objects 126 may include and/or represent various data, information, metadata, and/or statistics associated with those ports.

Examples of device-specific data 120 include, without limitation, data representative of specific physical ports on a network device, data indicating the performance levels of specific physical ports on a network device, data indicating identities or names of specific physical ports on a network device, data indicating administrative and/or link statuses of specific physical ports on a network device, Internet Protocol (IP) addresses of specific physical ports of a network device, certain zones associated with specific physical ports on a network device, Maximum Transmission Units (MTUs) associated with specific physical ports of a network device, data indicating speeds of specific physical ports on a network device, data indicating link modes of specific physical ports on a network device, data indicating auto-negotiation statuses of specific physical ports on a network device, data indicating media types of specific physical ports on network devices, variations or combinations of one or more of the same, and/or any other suitable device-specific data.

As illustrated in FIG. 1, exemplary system 100 may also include, deploy, and/or execute one or more graphical user interfaces, such as device-visualization interface 140. In some examples, device-visualization interface 140 may include and/or represent a graphical user interface shown, displayed, and/or presented on a computing device and/or monitor for viewing by a user, an administrator, and/or an analyst. In one example, device-visualization interface 140 may include and/or incorporate one or more graphical widgets, such as graphical chassis widget 142. In this example, graphical chassis widget 142 may constitute, graphically represent, and/or illustrate a logical view of certain ports and/or linecards on a network device.

Additionally or alternatively, device-visualization interface 140 may include and/or incorporate one or more graphical tables, such as graphical table 144. In this example, graphical table 144 may graphically represent and/or illustrate certain details, information, and/or categories from port-specific data objects 126.

In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing device 202 and/or network device 206. In some examples, and as will be described in greater detail below, one or more of modules 102 may cause computing device 202 to (1) query, in connection with monitoring service 132, network device 206 for device-specific data 120 that identifies features of network device 206, (2) determine, based at least in part on device-specific data 120, identities of a set of ports 224(1)-(N) on network device 206, (3) identify, based at least in part on device-specific data 120, port-specific data objects 126 corresponding to ports 224(1)-(N) on network device 206, (4) dynamically create, based at least in part on device-specific data 120, device-visualization interface 140 to network device 206 by (A) generating a graphical chassis widget 142 that illustrates a logical view of ports 224(1)-(N) on network device 206 and (B) generating a graphical table 144 that illustrates port-specific data objects 126, and then (5) provide, in connection with monitoring service 132, device-visualization interface 140 for presentation on computing device 202.

In some examples, computing device 202 may generally represent any type or form of physical computing device capable of reading computer-executable instructions. In one example, computing device 202 may include and/or be communicatively coupled to a display and/or monitor. In this example, computing device 202 may be able to display and/or present graphical user interfaces and/or images for viewing by a user, an administrator, and/or an analyst. Examples of computing device 202 include, without limitation, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, Personal Digital Assistants (PDAs), multimedia players, embedded systems, wearable devices, gaming consoles, displays, monitors, variations or combinations of one or more of the same, and/or any other suitable computing devices.

In some examples, network device 206 may generally represent any type or form of physical computing device capable of reading computer-executable instructions and/or handling network traffic. In one example, network device 206 may include and/or represent a physical router (such as a provider edge router, hub router, spoke router, autonomous system boundary router, and/or area border router). Additional examples of network device 206 include, without limitation, switches, hubs, modems, bridges, repeaters, gateways (such as broadband network gateways), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network device.

As illustrated in FIG. 2, network device 206 may include and/or incorporate ports 224(1)-(N) that facilitate communication with other devices via network 204. Ports 224(1)-(N) may include and/or represent any type or form of virtual or physical communication port on network device 206. Examples of ports 224(1)-(N) include, without limitation, Rills, RJ45s, RJ50's Ethernet ports, optical ports, modified modular jacks, Universal Serial Bus (USB) ports, FireWire ports, serial ports, parallel ports, Small Form-factor Pluggable (SFP) ports, Quad SFP (QSFP) ports, Virtual Chassis Ports (VCPs), variations or combinations of one or more of the same, and/or any other suitable ports.

In some examples, network 204 may generally represent any medium or architecture capable of facilitating communication or data transfer. In one example, network 204 may include and/or incorporate computing device 202 and/or network device 206 even though these devices are illustrated as being external to network 204 in FIG. 2. Additionally or alternatively, network 204 may include and/or incorporate other devices (not necessarily illustrated in FIG. 2) associated with one or more tenants and/or customers of a service provider and/or monitoring service 132. Network 204 may facilitate communication or data transfer using wireless and/or wired connections, Examples of network 204 include, without limitation, an intranet, an access network, a layer 2 network, a layer 3 network, a MPLS network, an IP network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
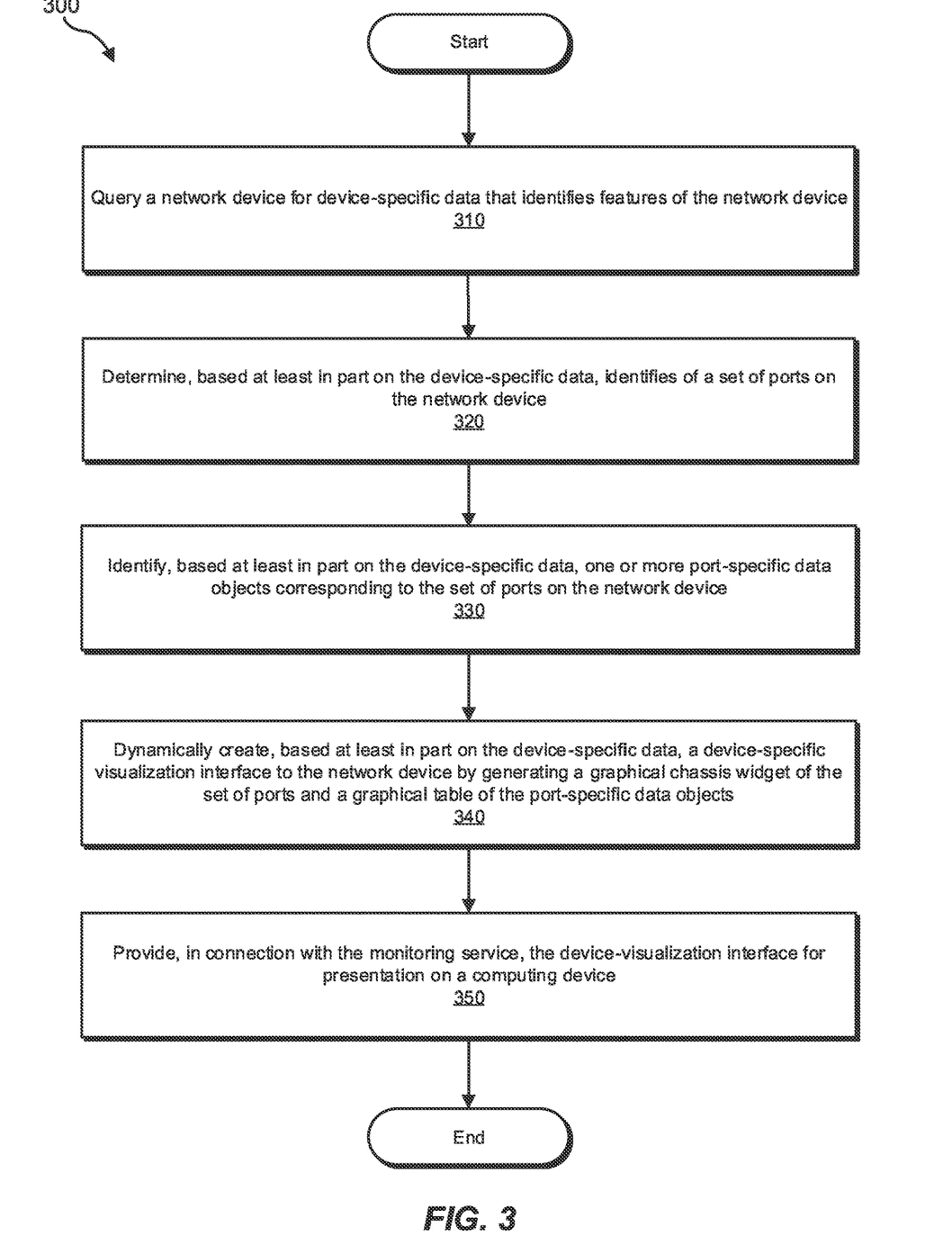
FIG. 3 is a flow diagram of an exemplary method for efficient presentation of device-level information via scalable interactive device-visualization interfaces.

FIG. 3 is a flow diagram of an exemplary computer-implemented method 300 for efficient presentation of device-level information via scalable interactive device-visualization interfaces. The steps shown in FIG. 3 may be performed by any suitable computer-executable code and/or computing system, including system 100 in FIG. 1, system 200 in FIG. 2, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one more of the systems described herein may query, in connection with a monitoring service, a network device for device-specific data that identifies features of the network device. For example, query module 104 may, as part of computing device 202 and/or network device 206 in FIG. 2, query network device 206 for device-specific data 120 in connection with monitoring service 132. In this example, device-specific data 120 may identify and/or specify certain features of and/or details about network device 206. In one embodiment, device-specific data 120 may be selected by and/or be of particular interest to one or more tenants and/or customers of a service provider and/or monitoring service 132.

Examples of certain features and/or details identified in device-specific data 120 include, without limitation, a configuration applied to at least a portion of the network device 206, a make and/or model of network device 206, a status of at least one of ports 224(1)-(N) on network device 206, at least one action that is launchable from device-visualization interface 140 and directed to network device 206, at least one statistic indicative of a performance level of at least a portion of network device 206, combinations or variations of one or more of the same, and/or any other suitable features and/or details.

The systems described herein may perform step 310 in a variety of ways and/or contexts. In some examples, query module 104 may monitor certain portions of network device 206 for system-level and/or device-level data of interest to a tenant and/or customer of a service provider and/or monitoring service 132. Additionally or alternatively, query module 104 may query network device 206 for system-level and/or device-level data of interest to the tenant and/or customer of the service provider and/or monitoring service 132. For example, query module 104 may query network device 206 for port identities 124 and/or port-specific data objects 126 via network 204. In this example, port identities 124 may identify and/or represent ports 224(1)-(N) with respect to one another, and port-specific data objects 126 may correspond to ports 224(1)-(N).

In one example, query module 104 may query network device 206 for device-specific data 120 via an Application Programming Interface (API) of monitoring service 132. For example, query module 104 may be able to access certain data and/or records stored on network device 206 by implementing and/or deploying the API of monitoring service 132, In this example, the API of monitoring service 132 may facilitate the delivery of such data and/or records from network device 206 to computing device 202 via network 204.

As illustrated in FIG. 3, at step 320 one or more of the systems described herein may determine, based at least in part on the device-specific data, identities of a set of ports on the network device. For example, determination module 106 may, as part of computing device 202 and/or network device 206 in FIG. 2, port identities 124 of ports 224(1)-(N) on network device 206. In one example, port identities 124 may specify and/or indicate that one of ports 224(1)-(N) is named and/or identified as "ge-0/0/0". In another example, port identities 124 may specify and/or indicate that another one of ports 224(1)-(N) is named and/or identified as "ge-0/0/1".

The systems described herein may perform step 320 in a variety of ways and/or contexts. In some examples, determination module 106 may analyze device-specific data 120. In one example, determination module 106 may search device-specific data 120 for port identities 124. During this search, determination module 106 may identify, find, and/or locate port identities 124 within device-specific data 120.

As illustrated in FIG. 3, at step 330 one or more of the systems described herein may identify, based at least in part on the device-specific data, one or more port-specific data objects corresponding to the set of ports on the network device. For example, determination module 106 may, as part of computing device 202 and/or network device 206 in FIG. 2, identify port-specific data objects 126 based at least in part on device-specific data 120. In this example, port-specific data objects 126 may correspond to ports 224(1)-(N) on network device 206.

Port-specific data objects 126 may include and/or represent a variety of different data, information, details, and/or statistics. Examples of post-specific data objects 126 include, without limitation, performance data about ports 224(1)-(N), names or identifiers of ports 224(1)-(N), current statuses of ports 224(1)-(N), IP addresses of ports 224(1)-(N), certain zones associated with ports 224(1)-(N), MTUs of ports 224(1)-(N), speeds of ports 224(1)-(N), link modes of ports 224(1)-(N), auto-negotiation statuses of ports 224(1)-(N), media types of ports 224(1)-(N), incoming traffic rates of ports 224(1)-(N), outgoing traffic rates of ports 224(1)-(N), Link Aggregation Groups (LAGS) associated with ports 224(1)-(N), variations or combinations of one or more of the same, and/or any other suitable port-specific data objects.

The systems described herein may perform step 330 in a variety of ways and/or contexts. As described above, determination module 106 may analyze device-specific data 120. In one example, determination module 106 may search device-specific data 120 for port-specific data objects 126. During this search, determination module 106 may identify, find, and/or locate port-specific data objects 126 within device-specific data 120.

As illustrated in FIG. 3, at step 340 one or more of the systems described herein may dynamically create a device-visualization interface of the network device based at least in part on the device-specific data. For example, creation module 108 may, as part of computing device 202 and/or network device 206 in FIG. 2, dynamically create device-visualization interface 140 based at least in part on device-specific data 120. To do so, creation module 108 may generate graphical chassis widget 142, which illustrates a logical view of ports 224(1)-(N) on network device 206. Additionally or alternatively, creation module 108 may generate graphical table 144, which illustrates port-specific data objects 126. Creation module 108 may then incorporate and/or assemble graphical chassis widget 142 and/or graphical table 144 within device-visualization interface 140.

The systems described herein may perform step 340 in a variety of ways and/or contexts. In some examples, creation module 108 may organize and/or produce graphical chassis widget 142 according to a certain color scheme that distinguishes the statuses of some of ports 224(1)-(N) from the others by their respective colors. For example, port-specific data objects 126 may identify and/or indicate one or more status indicators that represent the current statuses of ports 224(1)-(N). In this example, creation module 108 may generate, within graphical chassis widget 142, a first icon of one color that graphically indicates the current status of one of ports 224(1)-(N) based at least in part on those status indicators included in port-specific data objects 126. Additionally or alternatively, creation module 108 may generate, within graphical chassis widget 142, a second icon of another color that graphically indicates the current status of another one of ports 224(1)-(N) based at least in part on those status indicators included in port-specific data objects 126.

In some examples, creation module 108 may organize and/or produce graphical chassis widget 142 to graphically represent and/or indicate different port types of ports 224(1)-(N) on network device 208 by their respective icons. For example, port-specific data objects 126 may identify and/or indicate the different port types of ports 224(1)-(N). In this example, creation module 108 may generate, within graphical chassis widget 142, a first icon that graphically indicates a port type of one of ports 224(1)-(N) based at least in part on the port types included in port-specific data objects 126. Additionally or alternatively, creation module 108 may generate, within graphical chassis widget 142, a second icon that graphically indicates another port type of another one of ports 224(1)-(N) based at least in part on the port types included in port-specific data objects 126.

In some examples, creation module 108 may identify a set of categories to which port-specific data objects 126 correspond within device-specific data 120. For example, some of device-specific data 120 may be organized and/or tagged as a specific field or category. Additionally or alternatively, determination module 106 may classify some of device-specific data 120 as belonging to a specific field and/or category. Examples of such fields and/or categories is include, without limitation, a port identity category, an administrator status category, a link status category, an IP address category, a zone category, MTU category, a speed category, a link mode category, an auto-negotiation category, a media type category, variations or combinations of one or more of the same, and/or any other suitable fields or categories.

In such examples, upon identifying the set of categories, creation module 108 may populate graphical table 144 with various portions of device-specific data 120. For example, creation module 108 may populate each row of graphical table 144 with information, data, and/or statistics corresponding to a specific port included in ports 224(1)-(N). Additionally or alternatively, creation module 108 may populate each column of graphical table 144 with information, data, and/or statistics corresponding to a specific category included in the set of categories.

In some examples, creation module 108 may be able to dynamically scale device-visualization interface 140 to network device 206, In one example, during the development of device-visualization interface 140, creation module 108 may account for all of ports 224(1)-(N) irrespective of their number. For example, if network device 206 includes a total of forty-eight (48) ports of interest to a certain tenant and/or customer, creation module 108 may produce forty-eight (48) graphical icons representative of those ports within device-visualization interface 140. Accordingly, creation module 108 may dynamically scale device-visualization interface 140 to account for and/or represent network device irrespective of its device type, make, model, and/or size.

In some examples, certain features of network device 206 may change over time. For example, the status of one of ports 224(1)-(N) may change from active or up to inactive or down. In another example, a device plugged into one or more of ports 224(1)-(N) may be replaced at one point or another. To account for such changes to network device 206, creation module 108 may obtain updated device-specific data over time. In one example, query module 104 may poll and/or query network device 206 for updates to device-specific data 120 on a regular basis and/or in response to a certain event. Additionally or alternatively, network device 206 may deliver and/or provide, to computing device 202, updates to device-specific data 120 in response to changes that occur on network device 206.

As illustrated in FIG. 3, at step 350 one or more of the systems described herein may provide the device-visualization interface for presentation on a computing device in connection with the monitoring service. For example, presentation module 110 may, as part of computing device 202 and/or network device 206 in FIG. 2, provide device-visualization interface 140 for presentation on computing device 202 in connection with monitoring service 132. In this example, device-visualization interface 140 may include and/or represent graphical chassis widget 142 and/or graphical table 144. Device-visualization interface 140 may show and/or present graphical chassis widget 142 and at least a portion of graphical table 144 in a single view on a monitor and/or display of computing device 202.

In one example, the single view of device-visualization interface 140 may represent and/or constitute a perspective in which various graphical components and/or features of device-visualization interface 140 are displayed and/or visible on a monitor of computing device 202 at any given time. For example, the single view of device-visualization interface 140 may present and/or display graphical chassis widget 142 and/or graphical table 144 simultaneously within a monitor of computing device 202 at any given time. In this example, the single view of device-visualization interface 140 may present and/or display additional graphical cards, components, and/or features simultaneously within the monitor of computing device 202 at any given time.

The systems described herein may perform step 350 in a variety of ways and/or contexts. In some examples, presentation module 110 may direct computing device 202 to display device-visualization interface 140 for viewing by a user, an administrator, and/or an analyst. In one example, presentation module 110 may configure and/or arrange device-visualization interface 140 such that graphical chassis widget 142 is placed and/or located in one section of the single view. In this example, presentation module 110 may configure and/or arrange device-visualization interface 140 such that graphical table 144 is placed and/or located in another section of the single view.

In one example, the sections in which graphical chassis widget 142 and/or graphical table 144 are positioned may represent and/or constitute different areas of device-visualization interface 140. For example, the section in which graphical chassis widget 142 is positioned may represent and/or constitute a top-side area of device-visualization interface 140. In this example, the section in which graphical table 144 is positioned may represent and/or constitute a bottom-side area of device-visualization interface 140. Accordingly, graphical chassis widget 142 may be positioned above graphical table 144 within the single view of device-visualization interface 140.

In some examples, presentation module 110 may provide, within device-visualization interface 140, a hover feature that facilitates displaying a tooltip in connection with an icon over which a cursor is hovered. For example, as the cursor hovers over a specific port icon within device-visualization interface 140, the hover feature may retrieve certain details about that port and then cause device-visualization interface 140 to display and/or present such details as a tooltip. The tooltip may include and/or represent a dialog box that identifies any information relevant to the icon over which the cursor is hovered. In one example, the tooltip may identify and/or indicate the name and/or identifier of the corresponding port, the current status of the corresponding port, the amount of incoming traffic handled by the corresponding port, and/or the amount of outgoing traffic handled by the corresponding port.

In some examples, presentation module 110 may provide, within device-visualization interface 140, an action selector tool that facilitates selecting an action to be performed in connection with at least one of ports 224(1)-(N). In one example, determination module 106 may detect a selection of an action made by an administrator via the action selector tool. In response to the selection made via the action selector tool, creation module 108 may perform the action in accordance with the selection.

In some examples, presentation module 110 may provide, within device-visualization interface 140, a selectable drill-down feature that facilitates selecting portions of graphical chassis widget 142 to highlight as part of the presentation on computing device 202. In one example, determination module 106 may detect a selection of a portion of graphical chassis widget 142 made by an administrator via the selectable drilldown feature. In response to the selection made via the selectable drilldown feature, presentation module 110 may highlight the portion of graphical chassis widget 142 as part of the presentation on the computing device.

Presentation module 110 may highlight the selected portion of graphical chassis widget 142 in a variety of ways and/or contexts. For example, presentation module 110 may exclude, from the presentation on computing device 202, all portions of graphical chassis widget 142 except the portion selected via the selectable drilldown feature. In another example, presentation module 110 may mute at least one characteristic (e.g., color, size, transparency, solidity, shape, etc.) across all portions of graphical chassis widget 142 except the portion selected via the selectable drill down feature. Additionally or alternatively, presentation module 110 may intensify at least one characteristic (e.g., color, size, transparency, solidity, shape, etc.) of the portion of graphical chassis widget 142 selected via the selectable drill down feature.

Figure 4:
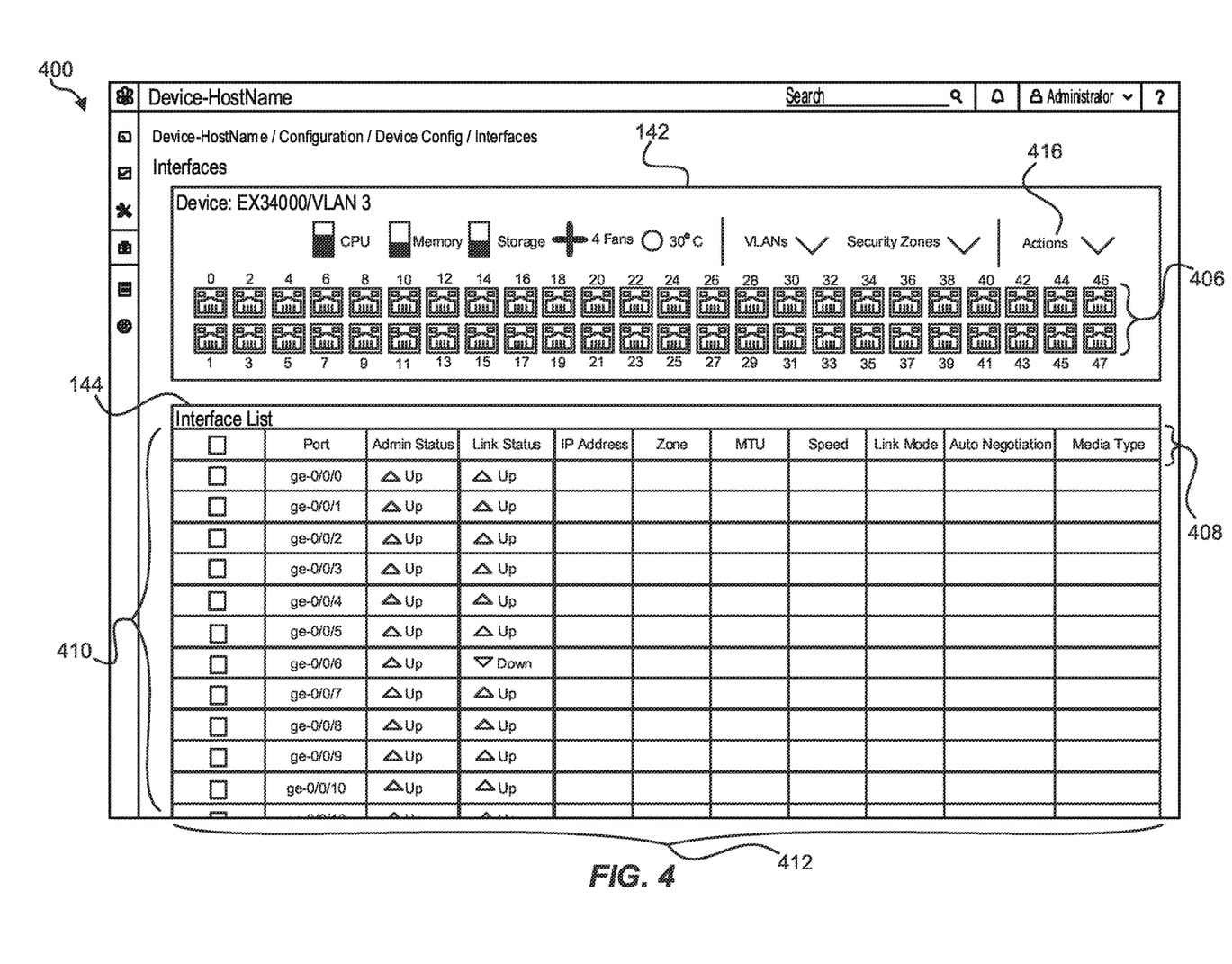
FIG. 4 is an illustration of an exemplary device-visualization interface that efficiently delivers and/or presents device-level information.
Figure 5:
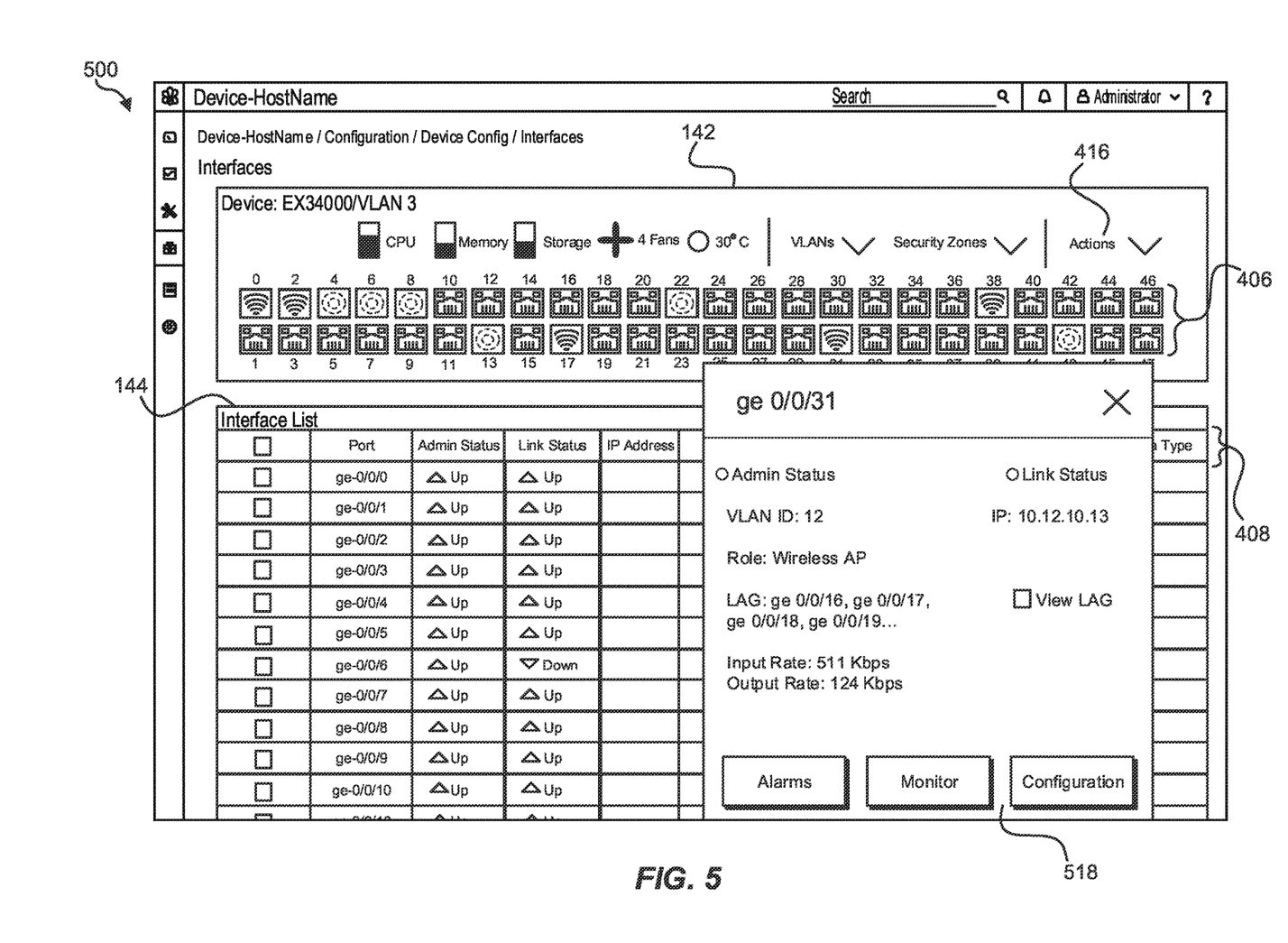
FIG. 5 is an illustration of an exemplary device-visualization interface that efficiently delivers and/or presents device-level information.

FIGS. 4 and 5 are illustrations of exemplary scalable interactive device-visualization interfaces 400 and 500, respectively, that efficiently deliver and/or present device-level information. As illustrated in FIGS. 4 and 5, device-visualization interfaces 400 and 500 may each include and/or incorporate graphical chassis widget 142 and a portion of graphical table 144 within a single view. In one example, graphical chassis widget 142 may be positioned above graphical table 144 within the single view. Additional information and/or graphical cards (although not explicitly labelled) may also be illustrated in FIGS. 4 and 5.

As illustrated in FIGS. 4 and 5, graphical chassis widget 142 may identify and/or report on forty-eight (48) individual communication ports on network device 206. In some examples, graphical chassis widget 142 may include and/or incorporate icons 406 that represent these communication ports. In one example, these communication ports may all refer to and/or represent RJ45 ports on network device 206. In this example, graphical chassis widget 142 may display and/or present icons 406 as a graphical representation of those RJ45 ports. In FIG. 4, icons 406 may each illustrate and/or visualize the form of a physical RJ45 port. In FIG. 5, some of icons 406 may illustrate and/or visualize the form of RJ45 ports while others ay illustrate and/or visualize certain modules (e.g., WIFI modules) and/or ports that have replaced RJ45 ports on network device 206.

In one example, graphical chassis widget 142 may implement certain color schemes across the icons to differentiate the active ports from the inactive ports. Any type of form of color scheme (e.g., green, red, light grey, dark grey, etc.) may be applied to convey certain information about the ports. For example, graphical chassis widget 142 may implement a green color scheme for all icons that represent the "up" ports on network device 206. In this example, graphical chassis widget 142 may implement a red color scheme for all icons that represent the "down" ports on network device 206. Additionally or alternatively, graphical chassis widget 142 may implement a grey color scheme for all icons that represent any irrelevant and/or unavailable ports on network device 206.

In some examples, graphical table 144 may include and/or represent a set of rows 410 that each correspond to a different one of the ports represented by icons 406. In such examples, each row may illustrate and/or how certain information, data, and/or statistics about a specific port on network device 206. In addition, graphical table 144 may include and/or represent a set of columns 412 that correspond to different categories 408 of information associated with the ports represented by icons 406. As illustrated in FIGS. 4 and 5, categories 408 may include and/or represent a port identity category, an administrator status category, a link status category, an IP address category, a zone category, MTh category, a speed category, a link mode category, an auto-negotiation category, and/or a media type category.

In one example, graphical table 144 may implement certain color schemes to draw attention to certain features. For example, graphical table 144 may implement a green color scheme for all "up" triangles included in the "admin status" column or the "link status" column. In this example, graphical table 144 may implement a red color scheme for all "down" triangles included in the "admin status" column or the "link status" column.

In some examples, graphical chassis widget 142 may include and/or provide an action selector tool 416 that facilitates selecting certain actions to be performed in connection with the ports represented by icons 406. One action option may involve and/or be directed to pinging a specific port on network device 206. Another action option may involve and/or be directed to performing a traceroute in connection with a specific port on network device 206.

In some examples, device-visualization interface 500 may include and/or provide a tooltip 518 in response to a mouse-hover over a specific icon shown in graphical chassis widget 142. For example, tooltip 518 may appear in device-visualization interface 500 as the cursor hovers over the icon corresponding to the "ge 0/0/31" port. As illustrated in FIG. 5, tooltip 518 may show and/or present a variety of information about the "ge 0/0/31" port, including the port's admin status, link status, VLAN identifier, role, LAG, input rate, output rate, etc.

As explained above in connection with FIGS. 1-5, the various systems and methods described herein may efficiently present device-level information via interactive device-visualization interfaces. In one example, a device-visualization interface may aggregate and/or visualizes key configuration and/or monitoring information across different ports and device elements of a network device. In this example, the device-visualization interface may display such information in a very intuitive and/or easy-to-understand way. A user may be able to interact with device ports and/or drill down further to change the view of specific information via the device-visualization interface. By doing so, the user may be able to analyze such information or to take corrective actions.

The device-visualization interface may be a scalable system that programmatically adapts to any network device or platform, thereby facilitating the presentation of key information consistently. The device-visualization interface may be applied to network devices that have multiple card slots. This feature may effectively eliminate the need to create static bitmap images of the corresponding chassis for every device type, model, and platform, thereby saving the time and money dedicated to building custom solutions for each and every network device and, at the same time, providing a very consistent and intuitive user interface.

This device-visualization interface may display various device information with the ability to drilldown. Such device information may include and/or identify port type (e.g., RJ45, SFP, QSP, VCP, etc.), port role (e.g., access, trunk, management, VoIP, etc.), port number, relevant groups (e.g., LAGs, VLAN groups, security zone groups, etc.), port status (e.g., configured, unconfigured, etc.), alerts or alarms on the port, LED status, and/or linecard status.

In some examples, the systems described herein may obtain data from the network device via Command Line Interface (CLI) commands. In such examples, the systems described herein may convert such data to JavaScript Object Notation (JSON) format, which is readable by the device-visualization interface. In one example, the systems described herein may include an application user interface that calls APIs, retrieves data via the APIs, and then translates the data to be represented in the device-visualization interface. When the device-visualization interface is loaded, the systems described herein may call these APIs and then render the returned data in a graphical chassis widget. This view of the graphical chassis widget may show the ports and the color-coded ports statuses. Each port may have a tooltip that appears in response to a mouse-hover. Such a tooltip may show more data about simply the port.

In some examples, the systems described herein may cache the data about each port and then display on the corresponding tooltip. When the user interacts with the device-visualization interlace, different actions on the device-visualization interface may trigger the APIs. For example, the device-visualization interface may include and/or incorporate dropdown options for conducting certain troubleshooting actions.

In some examples, the systems described herein may calculate and/or scale the graphical chassis widget based at least in part on the API data. In one example, the systems described herein may obtain chassis information from the network device and/or provide such chassis information to the graphical chassis widget for presentation. Such chassis information may include and/or identify containers, configuration elements, port configurations, port data, transceiver port data, device details, action events, and/or system status.

In some examples, the systems described herein may implement an algorithm that adapts to anomalies based at least in part on all possible device ports. For example, if the hardware accommodates eight (8) ports but monitoring is performed on only three (3) of those ports, the systems described herein may add, to the device-visualization interface, five (5) ports that are marked as unavailable. In this example, once those ports are rendered, the systems described herein may engage a monitoring API that provides the ports' statuses. The graphical chassis widget may also color-code (with, e.g., green, red, light grey, and/or dark grey) the various port icons according to their respective statuses.

Figure 6:
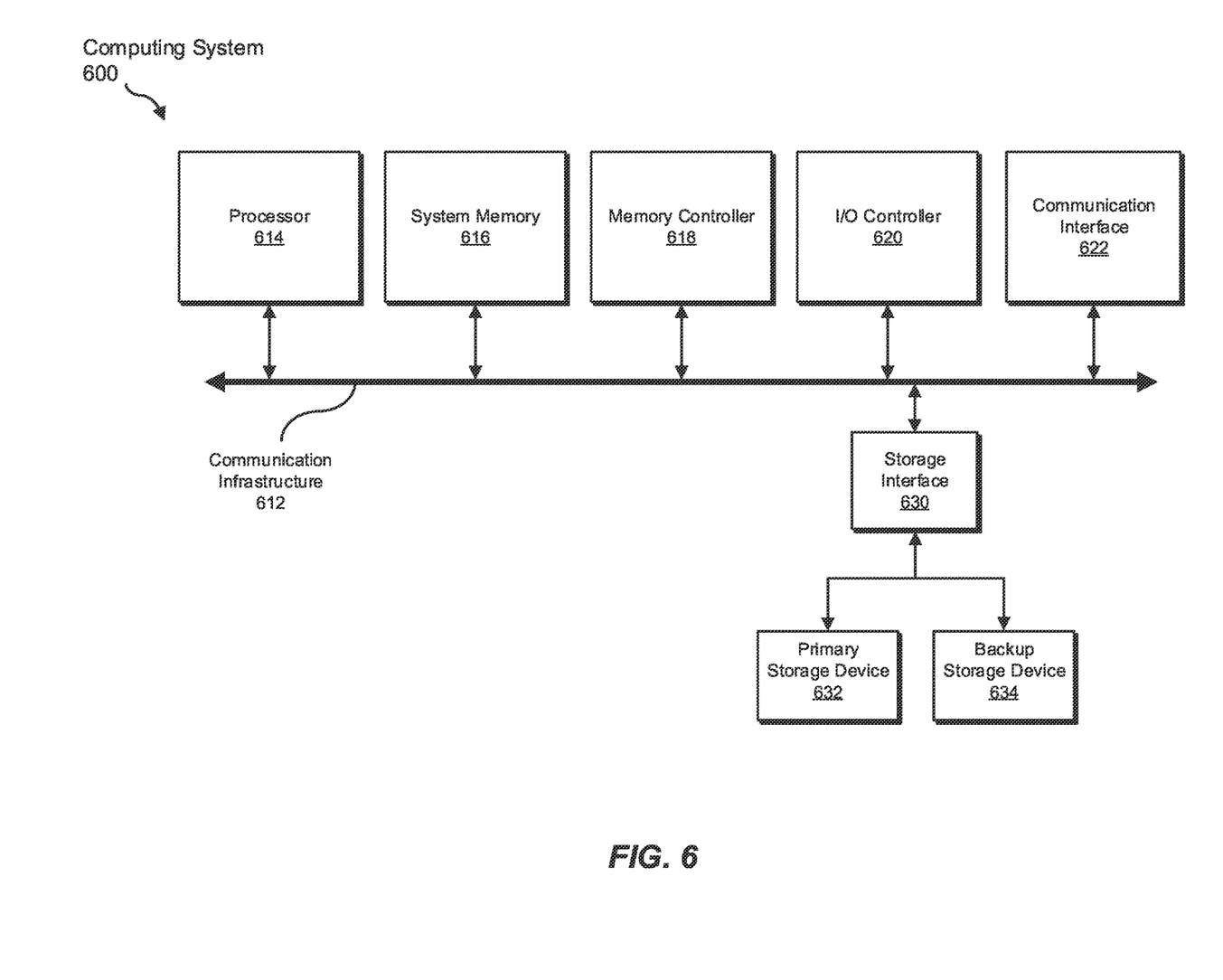
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an ASIC, a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in Fla 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another, Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
obtaining, from a remote device via a monitoring service, device-specific data that identifies a set of ports on the remote device, wherein the device-specific data indicates a number of ports included in the set of ports;
dynamically creating a user interface that graphically represents the remote device by:
generating, based at least in part on the number of ports indicated in the device-specific data, a graphical element that illustrates a logical view of the set of ports within the user interface;
generating, based at least in part on the number of ports indicated in the device-specific data, a graphical table that illustrates one or more port-specific data objects corresponding to the set of ports within the user interface; and
dynamically scaling, based at least in part on the number of ports indicated in the device-specific data, the graphical element and the graphical table within the user interface to the remote device; and
providing, in connection with the monitoring service, the user interface for presentation on a computing device.

2. The method of claim 1, wherein:
the port-specific data objects comprise one or more status indicators that represent current statuses of the set of ports on the remote device; and
generating the graphical element comprises:
generating, within the graphical element, a first icon of a first color that graphically indicates a current status of a first port included in the set of ports based at least in part on the status indicators included in the port-specific data objects; and
generating, within the graphical element, a second icon of a second color that graphically indicates a current status of a second port included in the set of ports based at least in part on the status indicators included in the port-specific data objects.

3. The method of claim 1, wherein:
the port-specific data objects comprise port types of the set of ports on the remote device; and
generating the graphical element comprises:
generating, within the graphical element, a first icon that graphically indicates a port type of a first port included in the set of ports based at least in part on the port types included in the port-specific data objects; and
generating, within the graphical element, a second icon that graphically indicates a port type of a second port included in the set of ports based at least in part on the port types included in the port-specific data objects.

4. The method of claim 1, wherein generating the graphical table comprises:
identifying, within the device-specific data, a set of categories to which the port-specific data objects correspond; and
populating the graphical table such that:
each row of the graphical table corresponds to a specific port included in the set of ports on the remote device; and
each column of the graphical table corresponds to a specific category included in the set of categories.

5. The method of claim 4, wherein the set of categories comprises at least one of:
a port identity category;
an administrator status category;
a link status category;
an Internet Protocol (IP) address category;
a zone category;
a Maximum Transmission Unit (MTU) category;
a speed category;
a link mode category;
an auto-negotiation category; and
a media type category.

6. The method of claim 1, wherein querying the remote device for the device-specific data comprises querying the remote device for device-specific data via an Application Programming Interface (API) of the monitoring service.

7. The method of claim 1, wherein providing the user interface for presentation on the computing device comprises providing, within the user interface, a hover feature that facilitates displaying a tooltip in connection with an icon over which a cursor is hovered.

8. The method of claim 7, wherein the tooltip comprises a dialog box that identifies at least one of:
a name of a port included in the set of ports;
a status of a port included in the set of ports;
an amount of incoming traffic handled by a port included in the set of ports; and
an amount of outgoing traffic forwarded by a port included in the set of ports.

9. The method of claim 1, wherein the device-specific data further identifies at least one of:
a configuration applied to at least a portion of the remote device;
a model of the remote device;
a status of at least one of the set of ports on the remote device;
an action that is launchable from the user interface and directed to the remote device; and
at least one statistic indicative of a performance level of at least a portion of the remote device.

10. The method of claim 1, wherein dynamically creating the user interface of the remote device comprises dynamically scaling the user interface to the remote device irrespective of a device type of the remote device.

11. The method of claim 1, wherein providing the user interface for presentation on the computing device comprises:
providing an action selector tool that facilitates selecting an action to be performed in connection with at least one port included in the set of ports on the remote device;
detecting a selection of an action made via the action selector tool; and
in response to detecting the selection made via the action selector tool, performing the action in accordance with the selection.

12. The method of claim 1, wherein providing the user interface for presentation on the computing device comprises:
providing, within the user interface, a selectable drilldown feature that facilitates selecting portions of the graphical element to highlight as part of the presentation on the computing device;
detecting a selection of a portion of the graphical element made via the selectable drilldown feature; and
in response to detecting the selection made via the selectable drilldown feature, highlighting the portion of the graphical element as part of the presentation on the computing device.

13. The method of claim 12, wherein highlighting the portion of the graphical element comprises at least one of:
excluding, from the presentation on the computing device, all portions of the graphical element except the portion selected via the selectable drilldown feature;

muting at least one characteristic across all portions of the graphical element except the portion selected via the selectable drilldown feature; and intensifying at least one characteristic of the portion of the graphical element selected via the selectable drill down feature.

14. A system comprising:

a query module, stored in memory, that obtains device-specific data that identifies a set of ports on a remote device via a monitoring service, wherein the device-specific data indicates a number of ports included in the set of ports;

a creation module, stored in memory, that dynamically creates a user interface that graphically represents the remote device by:

generating, based at least in part on the number of ports indicated in the device-specific data, a graphical element that illustrates a logical view of the set of ports within the user interface;

generating, based at least in part on the number of ports indicated in the device-specific data, a graphical table that illustrates one or more port-specific data objects corresponding to the set of ports within the user interface; and dynamically scaling, based at least in part on the number of ports indicated in the device-specific data, the graphical element and the graphical table within the user interface to the remote device;

a presentation module, stored in memory, that provides, in connection with the monitoring service, the user interface for presentation on a computing device; and at least one physical processor configured to execute the query module, the creation module, and the presentation module.

15. The system of claim 14, wherein:

the port-specific data objects comprise one or more status indicators that represent current statuses of the set of ports on the remote device; and the creation module:

generates, within the graphical element, a first icon of a first color that graphically indicates a current status of a first port included in the set of ports based at least in part on the status indicators included in the port-specific data objects; and generates, within the graphical element, a second icon of a second color that graphically indicates a current status of a second port included in the set of ports based at least in part on the status indicators included in the port-specific data objects.

16. The system of claim 14, wherein:

the port-specific data objects comprise port types of the set of ports on the remote device; and the creation module:

generates, within the graphical element, a first icon that graphically indicates a port type of a first port included in the set of ports based at least in part on the port types included in the port-specific data objects; and generates, within the graphical element, a second icon that graphically indicates a port type of a second port included in the set of ports based at least in part on the port types included in the port-specific data objects.

17. The system of claim 14, wherein the creation module:

identifies, within the device-specific data, a set of categories to which the port-specific data objects correspond; and populates the graphical table such that:

each row of the graphical table corresponds to a specific port included in the set of ports on the remote device; and each column of the graphical table corresponds to a specific category included in the set of categories.

18. A non-transitory computer-readable medium comprising one or more computer-executable instructions that, when executed by at least one processor of a computing device, cause the computing device to:

obtain, from a remote device via a monitoring service, device-specific data that identifies a set of ports on the remote device, wherein the device-specific data indicates a number of ports included in the set of ports;

dynamically create a user interface that graphically represents the remote device by:

generating, based at least in part on the number of ports indicated in the device-specific data, a graphical element that illustrates a logical view of the set of ports within the user interface;

generating, based at least in part on the number of ports indicated in the device-specific data, a graphical table that illustrates one or more port-specific data objects corresponding to the set of ports within the user interface; and dynamically scaling, based at least in part on the number of ports indicated in the device-specific data, the graphical element and the graphical table within the user interface to the remote device; and provide, in connection with the monitoring service, the user interface for presentation on a computing device.

19. The method of claim 1, wherein the device-specific data is collected for a particular customer, and the number of ports included in the set of ports comprises a number of ports that are of interest to the particular customer.

20. The method of claim 19, wherein the number of ports that are of interest to the particular customer comprises a subset of ports on the remote device, the subset of ports excluding at least one port on the remote device that is not of interest to the particular customer.

* * * * *